(12) United States Patent
Tashiro

(10) Patent No.: US 11,611,680 B2
(45) Date of Patent: Mar. 21, 2023

(54) INSPECTION DEVICE, IMAGE FORMING APPARATUS, AND NON-TRANSITORY COMPUTER READABLE MEDIUM STORING INSPECTION PROGRAM

(71) Applicant: FUJIFILM Business Innovation Corp., Tokyo (JP)

(72) Inventor: Yosuke Tashiro, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/327,768

(22) Filed: May 24, 2021

(65) Prior Publication Data

US 2022/0094811 A1 Mar. 24, 2022

(30) Foreign Application Priority Data

Sep. 18, 2020 (JP) .............................. JP2020-157925

(51) Int. Cl.
| | |
|---|---|
| *G06T 7/10* | (2017.01) |
| *H04N 1/409* | (2006.01) |
| *G06T 7/00* | (2017.01) |
| *H04N 1/00* | (2006.01) |

(52) U.S. Cl.
CPC ......... *H04N 1/4092* (2013.01); *G06T 7/0004* (2013.01); *H04N 1/00411* (2013.01); *H04N 1/00811* (2013.01); *G06T 2207/30144* (2013.01); *G06T 2207/30168* (2013.01)

(58) Field of Classification Search
CPC ............ H04N 1/4092; H04N 1/00411; H04N 1/00811; G06T 7/001; G06T 7/10; G06T 7/13; G06T 2207/30144; G06T 2207/30168
USPC ....... 358/1.9, 2.1, 3.23, 3.26, 1.18, 504, 538
See application file for complete search history.

(56) References Cited

U.S. PATENT DOCUMENTS

| | | | | |
|---|---|---|---|---|
| 2002/0126313 A1* | 9/2002 | Namizuka | ................. | G06T 7/12 382/199 |
| 2005/0226494 A1* | 10/2005 | Yamamoto | ................ | G06T 7/12 382/199 |
| 2011/0158484 A1* | 6/2011 | Mader | .................... | B65H 43/08 382/112 |
| 2012/0298862 A1* | 11/2012 | Chen | ....................... | G06T 7/001 250/307 |

FOREIGN PATENT DOCUMENTS

JP    6489433    3/2019

* cited by examiner

*Primary Examiner* — Jamares Q Washington
(74) *Attorney, Agent, or Firm* — JCIPRNET

(57) ABSTRACT

An inspection device includes a processor configured to use original image data as correct image data, and in a case where a first inspection of determining quality of read image data as an inspection target is performed using the correct image data, the read image data being obtained by reading an image-formed matter obtained by forming the original image data on a recording medium, perform a second inspection on a contour portion included in the read image data as the inspection target, the second inspection using read image data obtained based on the original image data, as the correct image data.

14 Claims, 8 Drawing Sheets

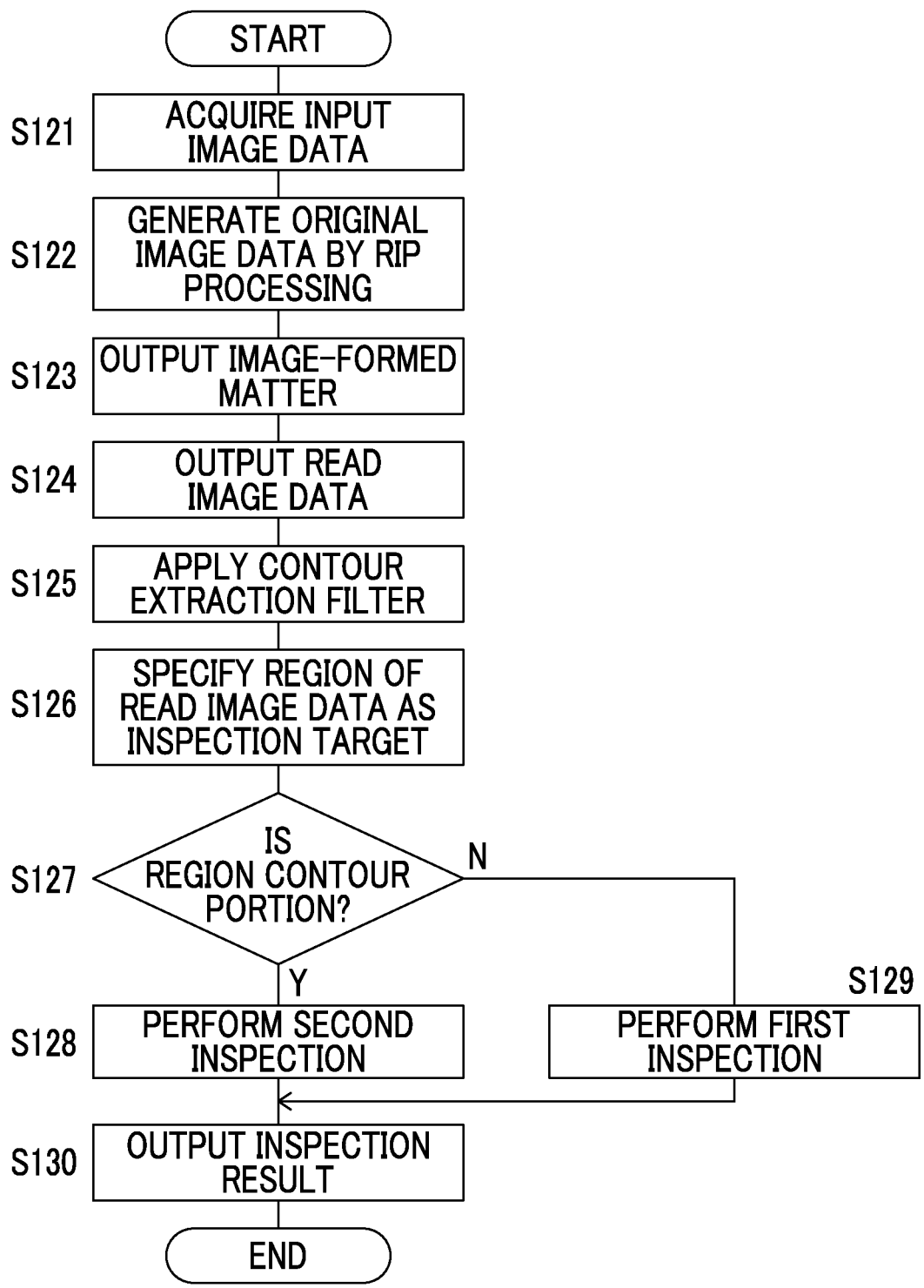

INSPECTION DEVICE, IMAGE FORMING APPARATUS, AND NON-TRANSITORY COMPUTER READABLE MEDIUM STORING INSPECTION PROGRAM

CROSS-REFERENCE TO RELATED APPLICATIONS

This application is based on and claims priority under 35 USC 119 from Japanese Patent Application No. 2020-157925 filed Sep. 18, 2020.

BACKGROUND

(i) Technical Field

The present invention relates to an inspection device, an image forming apparatus, and a non-transitory computer readable medium storing an inspection program.

(ii) Related Art

For example, JP6489433B discloses an image forming apparatus including a printing unit that forms an original image subjected to RIP processing, on paper, and an image reading unit that reads the original image formed on the paper and acquire a read image. The image forming apparatus includes an image forming condition acquisition unit, an image reading condition acquisition unit, a processing parameter determination unit, and an image inspection unit. The image forming condition acquisition unit that acquires an image forming condition used in a case where the printing unit forms an original image on paper. The image reading condition acquisition unit that acquires an image reading condition used in a case where the image reading unit reads the original image formed on the paper. The processing parameter determination unit determines a processing parameter based on the image forming condition and the image reading condition. The image inspection unit corrects a read image based on the processing parameter and inspects the finish of a printed matter by comparing the original image with the corrected read image. The image forming condition acquisition unit acquires, as the image forming condition, at least one of a color mode indicating the type of color printing or monochrome printing, paper information indicating characteristics of paper, screen information in halftone dot processing, or a printing rate. The image reading condition acquisition unit acquires at least one of a color mode indicating the type of color reading or monochrome reading or an image reading resolution, as the image reading condition. The processing parameter determination unit determines an image inspection item and a threshold value as a reference for determining the quality of the image inspection item, based on the image forming condition. Then, the processing parameter determination unit calculates a correction value for correcting the read image, by using the threshold value and information acquired based on the image forming condition and the image reading condition. The processing parameter determination unit specifies a halftone dot image area based on the screen information in the halftone dot processing, calculates density values of the halftone dot image area in the original image and the read image, and calculates the correction value based on a change of the density value depending on a difference between an image forming resolution and the image reading resolution included in the screen information. The image inspection unit corrects the read image using the correction value.

SUMMARY

In a case where read image data obtained by reading an image-formed matter is inspected using original image data (being the base of the image-formed matter) as correct image data, a line of a contour portion in the read image data may be thicker than a line of a contour portion in the correct image data due to, for example, characteristics of a printer. Therefore, it is likely to be determined as failure.

Aspects of non-limiting embodiments of the present disclosure relate to an inspection device, an image forming apparatus, and a non-transitory computer readable medium storing an inspection program capable of inspecting a contour portion with high accuracy in comparison to a case where an inspection is performed using only original image data as correct image data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

To achieve the above object, according to an aspect of the present disclosure, there is provided an inspection device including a processor configured to use original image data as correct image data, and in a case where a first inspection of determining quality of read image data as an inspection target is performed using the correct image data, the read image data being obtained by reading an image-formed matter obtained by forming the original image data on a recording medium, perform a second inspection on a contour portion included in the read image data as the inspection target, the second inspection using read image data obtained based on the original image data, as the correct image data.

BRIEF DESCRIPTION OF THE DRAWINGS

Exemplary embodiment(s) of the present invention will be described in detail based on the following figures, wherein:

FIG. 8 is a flowchart illustrating an example of a processing flow by an inspection program according to the second exemplary embodiment.

DETAILED DESCRIPTION

Hereinafter, exemplary embodiments for carrying out the technique of the present disclosure will be described in detail with reference to the drawings.

First Exemplary Embodiment

Figure 1:
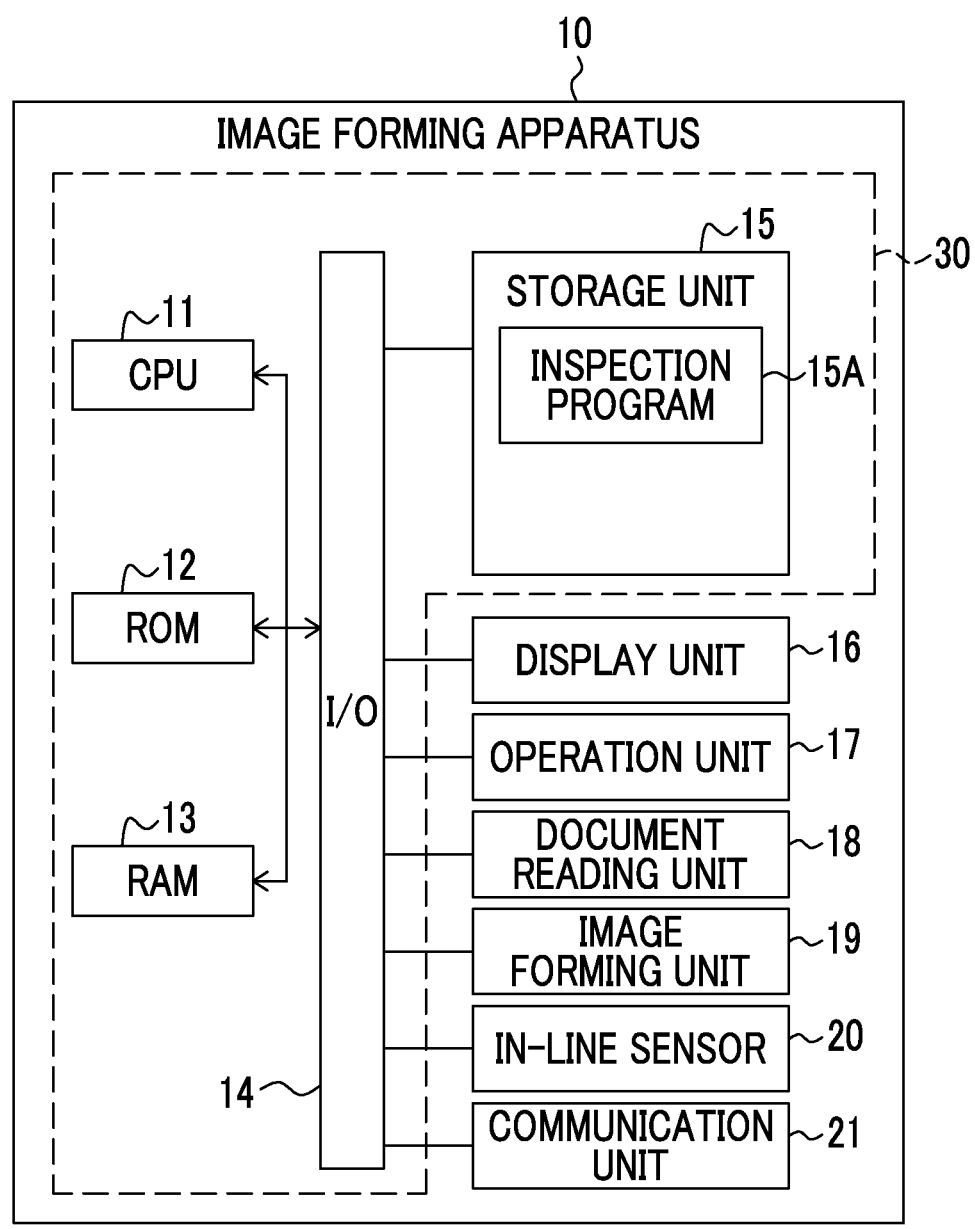
FIG. 1 is a block diagram illustrating an example of an electrical configuration of an image forming apparatus according to a first exemplary embodiment.

FIG. 1 is a block diagram illustrating an example of an electrical configuration of an image forming apparatus 10 according to a first exemplary embodiment.

As illustrated in FIG. 1, according to the present exemplary embodiment, the image forming apparatus 10 includes an inspection device 30, a display unit 16, an operation unit 17, a document reading unit 18, an image forming unit 19, an in-line sensor 20, and a communication unit 21. The image forming unit 19 is an example of a forming unit. The in-line sensor 20 is an example of a reading unit.

The inspection device 30 includes a central processing unit (CPU) 11, a read only memory (ROM) 12, a random access memory (RAM) 13, an input/output interface (I/O) 14, and a storage unit 15. In the present exemplary embodiment, the image forming apparatus 10 and the inspection device 30 are integrally provided, but the present disclosure is not limited to this. The image forming apparatus 10 and the inspection device 30 may be provided separately.

The units of the CPU 11, the ROM 12, the RAM 13, and the I/O 14 are connected to each other via a bus. Functional units including the storage unit 15, the display unit 16, the operation unit 17, the document reading unit 18, the image forming unit 19, the in-line sensor 20, and the communication unit 21 are connected to the I/O 14. Each of the functional units may communicate with the CPU 11 via the I/O 14.

A control unit is configured by the CPU 11, the ROM 12, the RAM 13, and the I/O 14. The control unit may be configured as a sub-control unit that controls an operation of a portion of the image forming apparatus 10, or may be configured as a portion of a main control unit that controls the entire operation of the image forming apparatus 10. For example, an integrated circuit such as a large scale integration (LSI) or an integrated circuit (IC) chipset is used for some or all of blocks of the control unit. An individual circuit may be used for each of the above blocks, or a circuit in which some or all of the blocks are integrated may be used. The above blocks may be provided integrally, or some blocks may be provided separately. A portion of each of the above blocks may be provided separately. The integration of the control unit is not limited to the LSI, and a dedicated circuit or a general-purpose processor may be used.

As the storage unit 15, for example, a hard disk drive (HDD), a solid state drive (SSD), or a flash memory is used. The storage unit 15 stores an inspection program 15A for executing inspection processing according to the present exemplary embodiment. The inspection program 15A may be stored in the ROM 12.

The inspection program 15A may be installed in advance in the image forming apparatus 10, for example. The inspection program 15A may be realized in a manner that the inspection program is stored in a non-volatile storage medium or distributed via a network, and is appropriately installed in the image forming apparatus 10. Examples of the non-volatile storage medium include a compact disc read only memory (CD-ROM), a magneto-optical disk, an HDD, a digital versatile disc read only memory (DVD-ROM), a flash memory, and a memory card.

For example, a liquid crystal display (LCD) or an organic electro-luminescence (EL) display is used for the display unit 16. The display unit 16 may integrally include a touch panel. Various operation keys such as a numeric keypad and a start key are provided in the operation unit 17. The display unit 16 and the operation unit 17 receive various instructions from a user of the image forming apparatus 10. The various instructions include, for example, an instruction to start reading a document, and an instruction to start copying the document. The display unit 16 displays various types of information such as the result of processing executed in accordance with the instruction received from the user and the notification in response to the processing.

The document reading unit 18 takes documents placed on a paper feed tray of an automatic document feeder (not illustrated) provided on the upper portion of the image forming apparatus 10 one by one, and optically reads the taken document to obtain image information. Alternatively, the document reading unit 18 optically reads a document placed on a document stand such as platen glass to obtain image information.

The image forming unit 19 forms, on a recording medium such as paper, an image based on image information obtained by reading of the document reading unit 18 or image information obtained from an external personal computer (PC) connected via the network. In the present exemplary embodiment, an electrophotographic method will be described as an example of a method of forming an image, but another method such as an inkjet method may be adopted.

In a case where the method of forming an image is an electrophotographic method, the image forming unit 19 includes a photoconductor drum, a charging unit, an exposing unit, a developing unit, a transfer unit, and a fixing unit. The charging unit applies a voltage to the photoconductor drum to charge the surface of the photoconductor drum. The exposing unit exposes the photoconductor drum charged by the charging unit with light corresponding to image information, so as to form an electrostatic latent image on the photoconductor drum. The developing unit develops the electrostatic latent image formed on the photoconductor drum with a toner to form a toner image on the photoconductor drum. The transfer unit transfers the toner image formed on the photoconductor drum to a recording medium. The fixing unit fixes the toner image transferred to the recording medium by heating and pressurizing.

The in-line sensor 20 reads an image formed on a recording medium by the image forming unit 19.

The communication unit 21 is connected to a network such as the Internet, a local area network (LAN), and a wide area network (WAN), and can communicate with an external PC or the like via the network.

Next, an image reading structure using the in-line sensor 20 will be described with reference to FIGS. 2A and 2B.

Figure 2A:
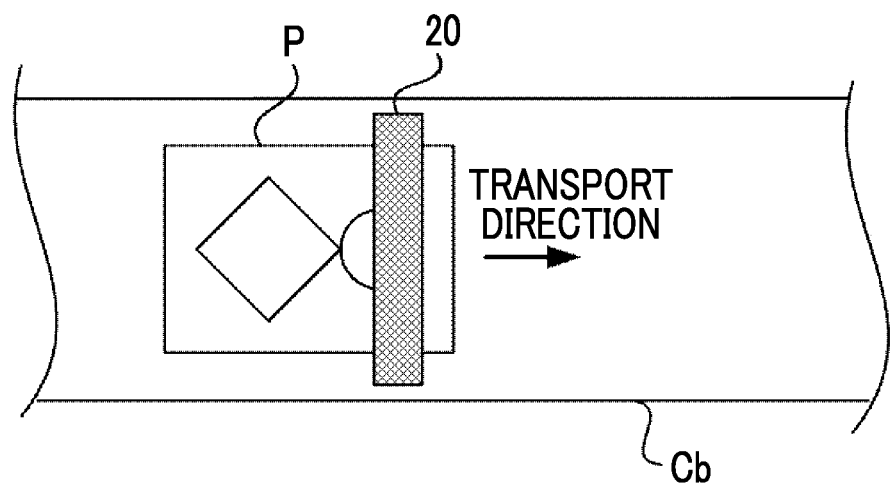
FIG. 2A is a top view illustrating an example of an image reading structure using an in-line sensor according to the first exemplary embodiment.

FIG. 2A is a top view illustrating an example of the image reading structure using the in-line sensor 20 according to the present exemplary embodiment. FIG. 2B is a side view illustrating the example of the image reading structure using the in-line sensor 20 according to the present exemplary embodiment.

Figure 2B:
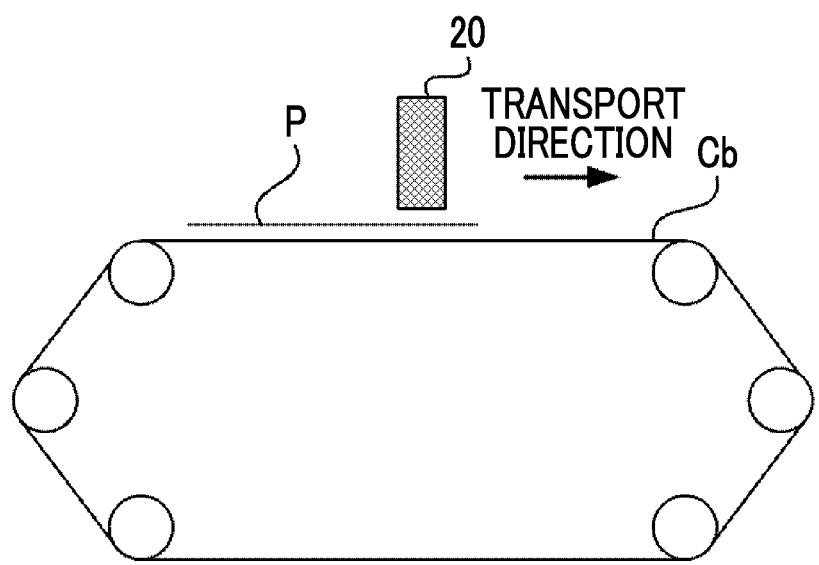
FIG. 2B is a side view illustrating the example of the image reading structure using the in-line sensor according to the first exemplary embodiment.

As illustrated in FIGS. 2A and 2B, the in-line sensor 20 reads an image formed on a recording medium P such as paper. The in-line sensor is provided, for example, over a transport belt Cb for transporting the recording medium P between the above-described fixing unit and an exit tray (not illustrated). For example, sensors such as a charge coupled device (CCD) and a complementary metal oxide semiconductor (CMOS) are used for the in-line sensor 20. In the in-line sensor 20, in a case where light is emitted from a light source, reflected light from the recording medium P is imaged on a light receiving unit through a light receiving lens, and is converted into an electrical signal in accordance with the amount of the reflected light by the light receiving unit. Thus, measurement data is output. The in-line sensor 20 sequentially acquires the measurement data for each line of the recording medium P by moving the recording medium P in a transport direction. At a time point at which the entirety of the recording medium P passes, the in-line sensor 20 acquires read image data corresponding to one surface of the recording medium P. The acquired read image data is stored in the storage unit 15.

According to the present exemplary embodiment, the image forming apparatus 10 has a function of performing a first inspection and a second inspection of inspecting an image-formed matter.

The first inspection is an inspection in which original image data is used as correct image data, and the read image data obtained by reading the image-formed matter obtained by forming the original image data on a recording medium is set as an inspection target. In the first inspection, the correct image data being the original image data is collated with the read image data as the inspection target, and the quality of the read image data as the inspection target is determined. A plurality of pieces of read image data may be set as the inspection target. The original image data is image data that is the basis of an image to be image-formed (printed). For example, data (rasterized data) after raster image processor (RIP) processing, bitmap data, and graphics interchange format (GIF) data are applied.

In the second inspection, read image data obtained by reading the image-formed matter obtained by forming the original image data on a recording medium is used as the correct image data, and read image data obtained by reading a new image-formed matter is set as the inspection target. In the second inspection, the correct image data being the read image data is collated with the read image data as the inspection target, and the quality of the read image data as the inspection target is determined. The correct image data may be selected from a plurality of pieces of read image data, and a plurality of pieces of read image data may be set as the inspection target, similar to the first inspection.

In the second inspection, for example, pieces of read image data obtained by reading an image-formed matter obtained by forming original image data on some recording media is displayed as candidates for correct image data. The read image data selected from the pieces of read image data by the user is used as the correct image data, and read image data of an image-formed matter newly obtained after that is set as the inspection target.

Next, the first inspection and the second inspection according to the present exemplary embodiment will be specifically described with reference to FIG. 3.

Figure 3:
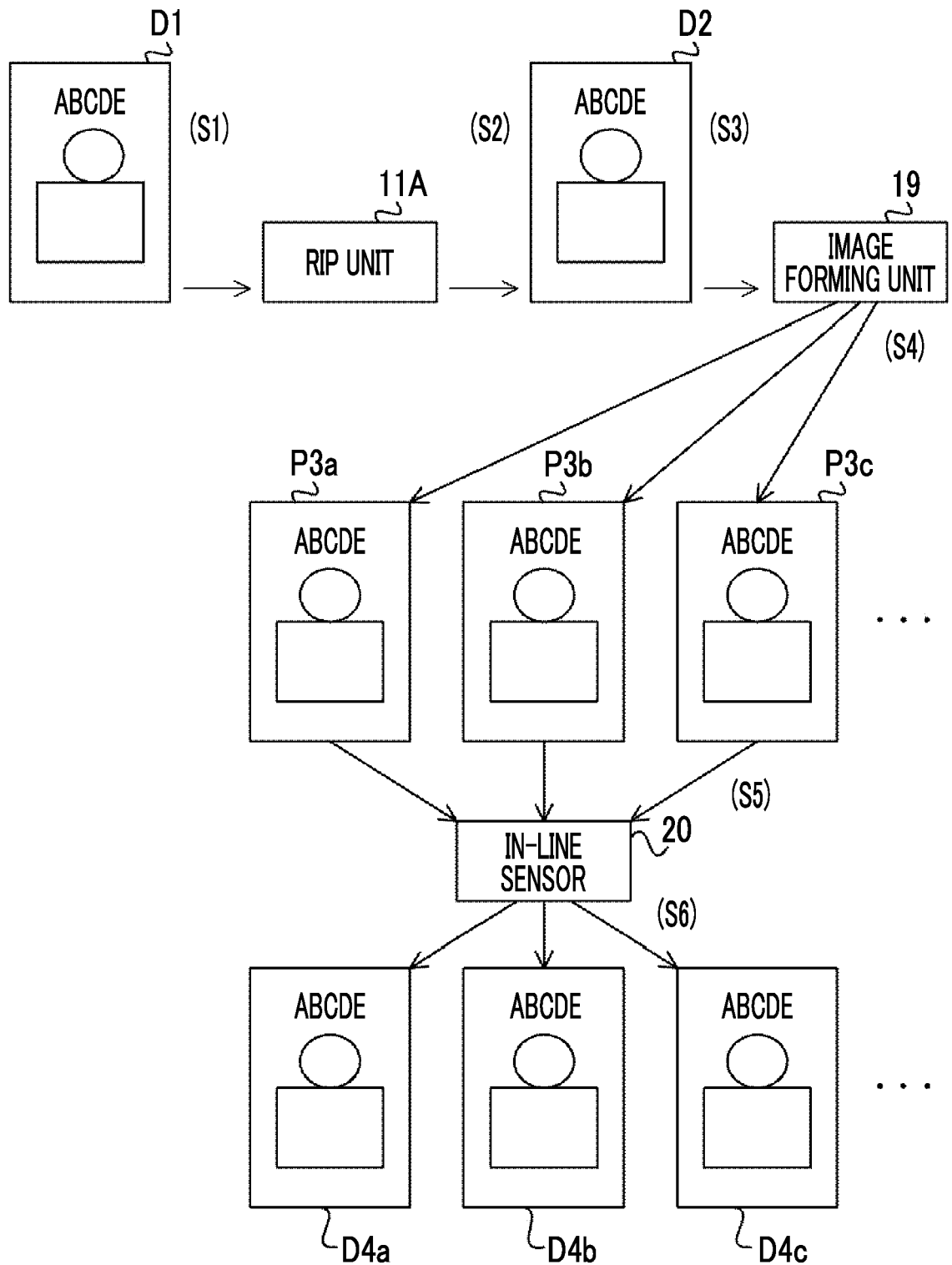
FIG. 3 is a diagram illustrating a first inspection and a second inspection according to the first exemplary embodiment.

FIG. 3 is a diagram illustrating the first inspection and the second inspection according to the present exemplary embodiment.

Firstly, the first inspection using original image data as the correct image data will be described.

In (S1) of FIG. 3, a RIP unit 11A receives an input of image data D1 described in the page description language (PDL) as an example. Examples of the PDL include PRINTER CONTROL LANGUAGE (PCL, registered trademark) and POST SCRIPT (PS, registered trademark). The RIP unit 11A executes RIP processing, and a specific description will be made later.

In (S2), the RIP unit 11A executes the RIP processing on the image data D1 of which the input is received, and outputs original image data D2. In the first inspection, the original image data D2 is used as correct image data.

In (S3), the image forming unit 19 receives the input of the original image data D2.

In (S4), the image forming unit 19 forms the original image data D2 of which the input is received, for example, on a plurality of recording media, and outputs a plurality of image-formed matters P3a to P3c.

In (S5), as an example, as illustrated in FIGS. 2A and 2B described above, the in-line sensor 20 reads each of the plurality of image-formed matters P3a to P3c transported on the transport belt Cb.

In (S6), the in-line sensor 20 outputs a plurality of pieces of read image data D4a to D4c obtained by reading the plurality of image-formed matters P3a to P3c, respectively. In the first inspection, the plurality of pieces of read image data D4a to D4c are set as the inspection target.

In the first inspection, the correct image data being the original image data D2 is collated with each of the plurality of pieces of read image data D4a to D4c as the inspection target, and the quality of each of the plurality of pieces of read image data D4a to D4c is determined.

Next, the second inspection in which the read image data obtained by reading the image-formed matter is used as the correct image data will be described.

In FIG. 3, the processes of (S1) to (S6) are similar. However, in the second inspection, for example, the read image data D4a is used as the correct image data, and new read image data D4b and D4c output after the read image data D4a are set as the inspection target. In the second inspection, the correct image data being the read image data D4a is collated with each of the pieces of new read image data D4b and D4c as the inspection target, and the quality of each of the pieces of new read image data D4b and D4c is determined.

Here, in a case where the first inspection using the original image data as the correct image data is performed, as described above, the line of a contour portion may be thicker than that in the correct image data due to the characteristics of a printer and the like. Thus, it is likely to be determined as failure. Therefore, it is intended to improve the inspection accuracy of the contour portion. The contour portion refers to a portion representing the contour of a text, a figure, an image, or the like.

In the image forming apparatus 10 according to the present exemplary embodiment, in a case where the first inspection using the original image data as the correct image data is performed, regarding the contour portion of the read image data as the inspection target, the second inspection in which the read image data obtained by reading the image-formed matter is used as the correct image data is performed. In the second inspection, since the read image data is used as the correct image data, it is considered that the states (for example, size and line thickness) of the images to be collated are substantially identical to the states in the first inspection. That is, the second inspection is more appropriate for the contour portion than the first inspection. Therefore, the inspection accuracy of the contour portion is improved.

Figure 4:
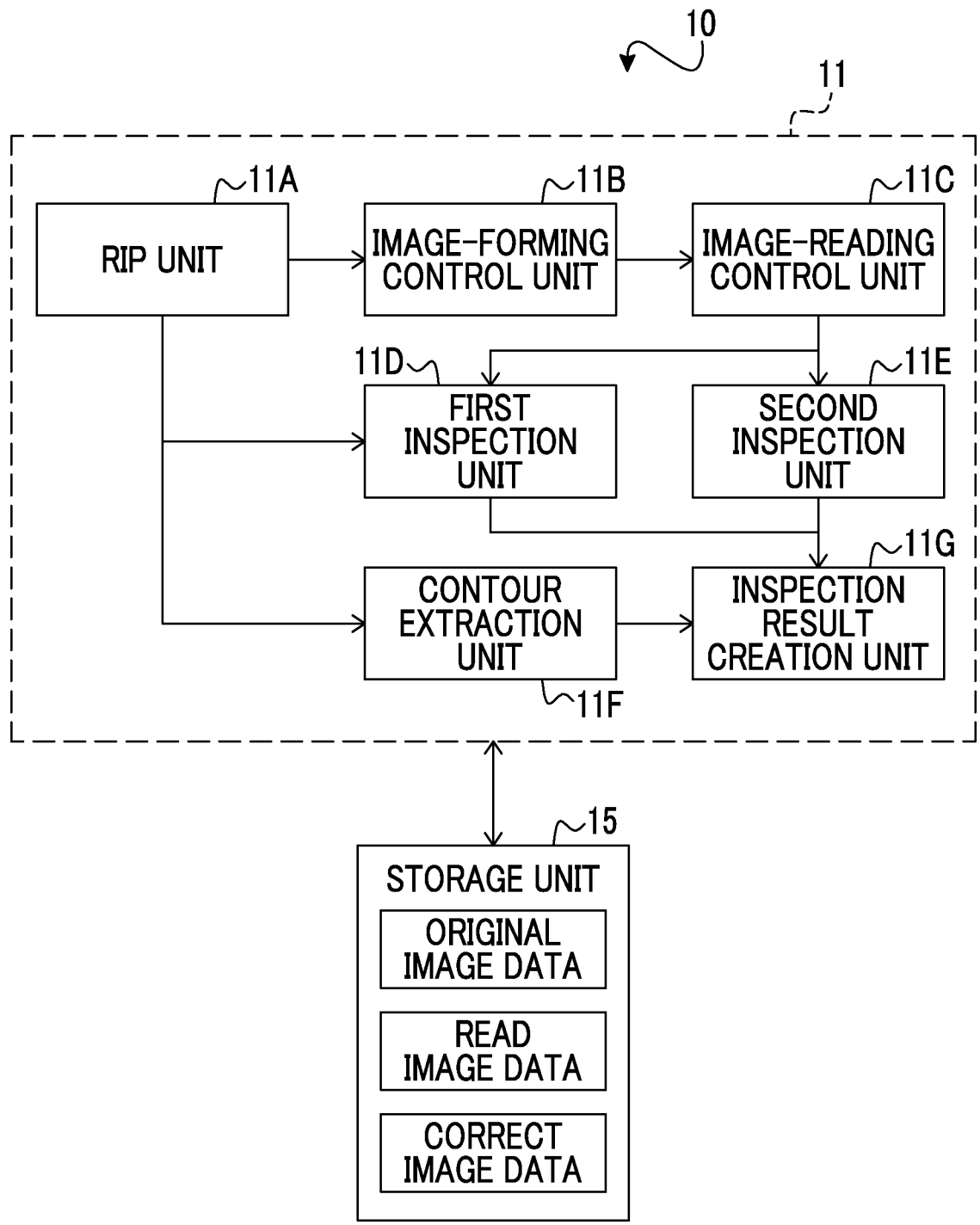
FIG. 4 is a block diagram illustrating an example of a functional configuration of the image forming apparatus according to the first exemplary embodiment.

Specifically, the CPU 11 in the image forming apparatus 10 according to the first exemplary embodiment writes the inspection program 15A stored in the storage unit 15 into the RAM 13, and executes the inspection program to function as the units illustrated in FIG. 4.

FIG. 4 is a block diagram illustrating an example of a functional configuration of the image forming apparatus 10 according to the first exemplary embodiment.

As illustrated in FIG. 4, the CPU 11 in the image forming apparatus 10 according to the present exemplary embodiment functions as the RIP unit 11A, an image-forming control unit 11B, an image-reading control unit 11C, a first inspection unit 11D, a second inspection unit 11E, and a contour extraction unit 11F, and an inspection result creation unit 11G.

As an example, the RIP unit 11A interprets the input image data described in the PDL to generate intermediate data, performs color conversion on the generated intermediate data, and performs rendering to generate original image data. As described above, the original image data may be, for example, rasterized data, bitmap data, or GIF data. The original image data generated by the RIP unit 11A is registered in the storage unit 15. In the above-described example in FIG. 3, the original image data corresponds to the original image data D2.

The image-forming control unit 11B controls the operation of the image forming unit 19. The image forming unit 19 forms the original image data registered in the storage unit 15 on a recording medium based on a control signal from the image-forming control unit 11B, and outputs an image-formed matter.

The image-reading control unit 11C controls the operation of the in-line sensor 20. The in-line sensor 20 reads the image-formed matter output from the image forming unit 19 based on a control signal from the image-reading control unit 11C, and outputs read image data. The read image data output from the in-line sensor 20 is registered in the storage unit 15. In the above-described example in FIG. 3, the read image data corresponds to the pieces of read image data D4a to D4c.

The first inspection unit 11D performs the first inspection. Specifically, the first inspection unit 11D uses the original image data registered in the storage unit 15 as the correct image data, and determines the quality of the read image data as the inspection target by using the correct image data. That is, the first inspection unit collates the correct image data being the original image data with the read image data as the inspection target, and determines the quality of the collated read image data. In the above-described example in FIG. 3, the read image data as the inspection target corresponds to the pieces of read image data D4a to D4c.

The second inspection unit 11E performs the second inspection. Specifically, the second inspection unit 11E uses the read image data registered in the storage unit 15 as the correct image data, and determines the quality of read image data obtained by reading a new image-formed matter, as the inspection target, by using the correct image data. That is, the second inspection unit collates the correct image data being the read image data with the read image data as the inspection target, and determines the quality of the collated read image data. In the above-described example in FIG. 3, the correct image data corresponds to, for example, the first read image data D4a, and the read image data as the inspection target corresponds to the pieces of read image data D4b and D4c. Since the read image data D4a is the correct image data, the read image data D4a is not the inspection target. However, the inspection result corresponding to the inspection result of the first inspection is set to "favorable".

That is, in the present exemplary embodiment, both the first inspection and the second inspection are performed on all pieces of the read image data set as the inspection target by the first inspection unit 11D and the second inspection unit 11E.

The contour extraction unit 11F extracts the contour portion by applying the contour extraction filter to the original image data or the read image data. As an example, known techniques such as a Laplacian filter and a Sobel filter are applied to the contour extraction filter.

The inspection result of the first inspection and the inspection result of the second inspection on the read image data as the inspection target are input to the inspection result creation unit 11G. The inspection result creation unit 11G determines the quality of the contour portion included in the read image data as the inspection target by using the inspection result of the second inspection. The inspection result creation unit determines the quality of the portion other than the contour portion (for example, blank portion) by using the inspection result of the first inspection. The inspection result creation unit 11G creates a final inspection result based on the determination results and outputs the created inspection result.

Specifically, the inspection result creation unit 11G associates the contour portion of the read image data set as the correct image data in the second inspection with the contour portion of the read image data as the inspection target, by using a contour extraction result which is input from the contour extraction unit 11F and is obtained by the contour extraction filter. This makes it possible to specify the contour portion of the read image data as the inspection target. The inspection result of the second inspection is adopted for the determination of the quality of the specified contour portion. The inspection result of the first inspection is adopted for the determination of the portion other than the contour portion. That is, both the first inspection and the second inspection are performed on the read image data being the inspection target, and the inspection results are sorted in accordance with whether or not the portion is the contour portion.

Specifically, in the case of the contour portion, in a case where the inspection result of the first inspection is "poor" and the inspection result of the second inspection is "favorable", "favorable" being the inspection result of the second inspection is adopted as the determination result for the contour portion. In a case where the inspection result of the first inspection is "favorable" and the inspection result of the second inspection is "favorable", "favorable" being the inspection result of the second inspection is adopted as the determination result for the contour portion. In a case where the inspection result of the first inspection is "poor" and the inspection result of the second inspection is "poor", "poor" being the inspection result of the second inspection is adopted as the determination result for the contour portion. In a case where the inspection result of the first inspection is "favorable" and the inspection result of the second inspection is "poor", "poor" being the inspection result of the second inspection is adopted as the determination result for the contour portion.

In the case of a blank portion as an example of the portion other than the contour portion, in a case where the inspection result of the first inspection is "poor" and the inspection result of the second inspection is "favorable", "poor" being the inspection result of the first inspection is adopted as the determination result for the blank portion. In a case where the inspection result of the first inspection is "favorable" and the inspection result of the second inspection is "favorable", "favorable" being the inspection result of the first inspection is adopted as the determination result for the blank portion. In a case where the inspection result of the first inspection is "poor" and the inspection result of the second inspection is "poor", "poor" being the inspection result of the first inspection is adopted as the determination result for the blank portion. In a case where the inspection result of the first inspection is "favorable" and the inspection result of the second inspection is "poor", "favorable" being the inspection result of the first inspection is adopted as the determination result for the blank portion.

The inspection result creation unit 11G performs a control of displaying the final inspection result for the read image data of the inspection target, on the display unit 16. Specifically, in a case where the result obtained by determining the quality of the contour portion is identical to the result obtained by determining the quality of the portion other than the contour portion, the inspection result creation unit 11G performs a control of displaying the identical determination result as the inspection result for the read image data as the inspection target. In a case where the result obtained by determining the quality of the contour portion is different from the result obtained by determining the quality of the portion other than the contour portion, as illustrated in FIG. 5, the inspection result creation unit 11G performs a control of displaying the different determination results as the inspection result for the read image data as the inspection target, and displaying a screen for receiving whether or not the user accepts the results.

Figure 5:
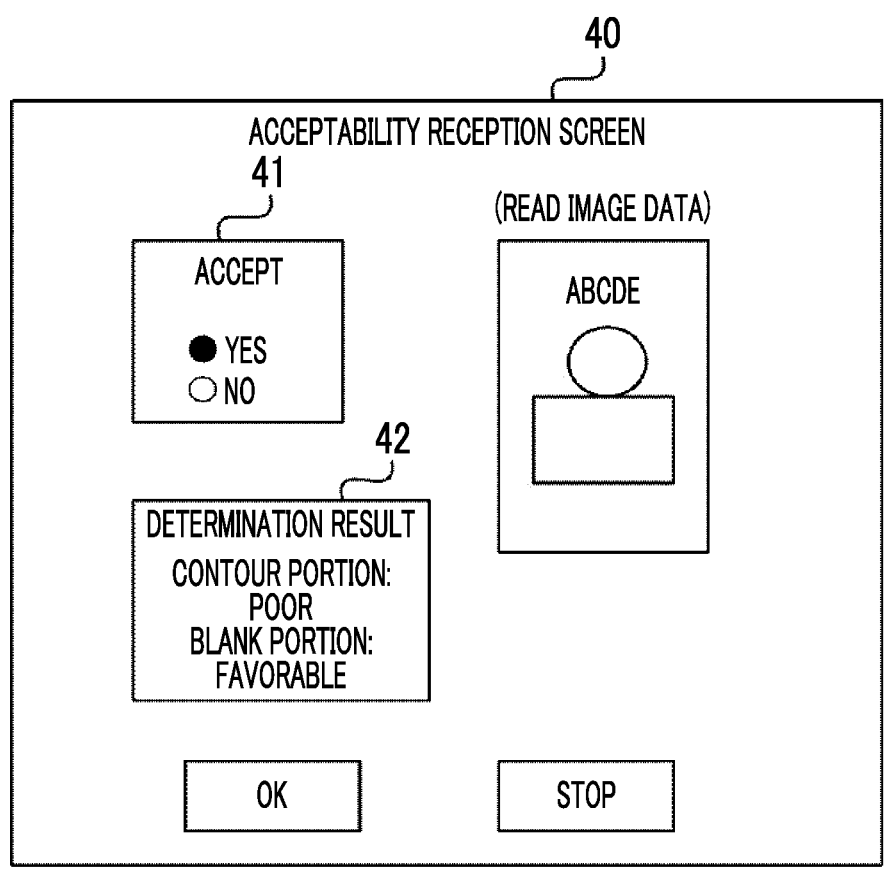
FIG. 5 is a front view illustrating an example of an acceptability reception screen according to the first exemplary embodiment.

FIG. 5 is a front view illustrating an example of an acceptability reception screen 40 according to the present exemplary embodiment.

On the acceptability reception screen 40 illustrated in FIG. 5, the read image data as the inspection target is displayed, and an acceptance selection field 41 and a determination result 42 are displayed. In the determination result 42, the result obtained by determining the quality of the contour portion and the result obtained by determining the quality of the blank portion are displayed. "Yes" and "No" are displayed in the acceptance selection field 41 so as to be selectable. In a case where the user looks at the determination result 42 and the read image data, and accepts the determination result, the user selects "Yes". In a case where it is not possible for the user to accept the determination result, the user selects "No". Then, in a case where the user operates an "OK" button, the selection is applied as the final inspection result.

Next, the action of the image forming apparatus 10 according to the first exemplary embodiment will be described with reference to FIG. 6.

Figure 6:
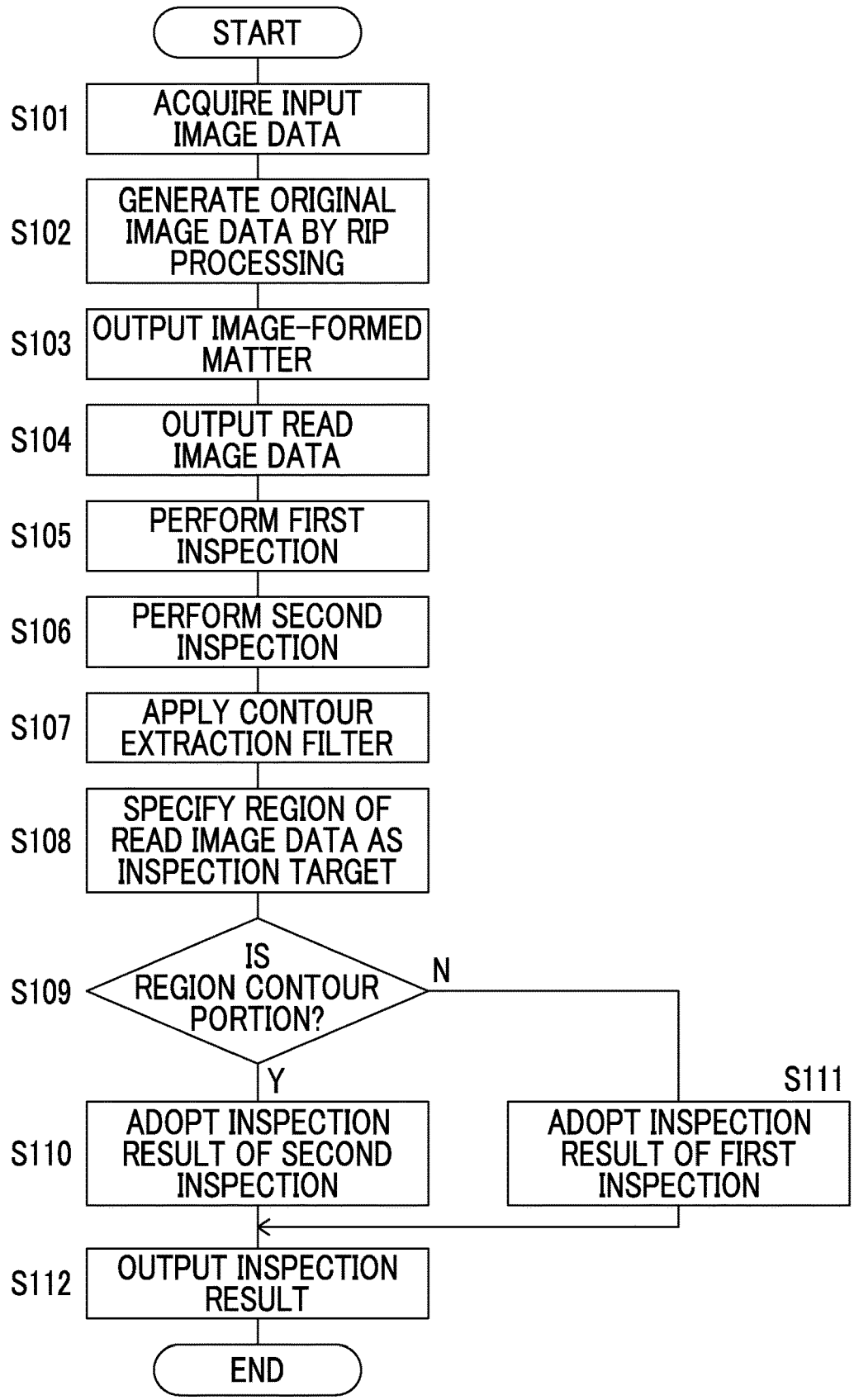
FIG. 6 is a flowchart illustrating an example of a processing flow by an inspection program according to the first exemplary embodiment.

FIG. 6 is a flowchart illustrating an example of a processing flow by the inspection program 15A according to the first exemplary embodiment.

Firstly, in a case where the image forming apparatus 10 is instructed to perform the inspection, the inspection program 15A is started to perform each of the following steps.

In Step S101 in FIG. 6, the CPU 11 acquires input image data from the document reading unit 18 or an external PC.

In Step S102, the CPU 11 performs RIP processing on the input image data acquired in Step S101 to generate original image data. The generated original image data is registered in the storage unit 15. As described above, for example, data (rasterized data) after the RIP processing, bitmap data, and GIF data are applied as the original image data.

In Step S103, the CPU 11 transmits a control signal to the image forming unit 19, and controls the operation of the image forming unit 19 to form the original image data registered in Step S102 on a recording medium and output an image-formed matter. A plurality of recording media may be used, and a plurality of image-formed matters may be output.

In Step S104, the CPU 11 transmits a control signal to the in-line sensor 20, and controls the operation of the in-line sensor 20 to read the image-formed matter output in Step S103, and output the read image data. In a case where a plurality of image-formed matters are provided, a plurality of pieces of read image data are output.

In Step S105, the CPU 11 uses the original image data as the correct image data, and performs the first inspection on all pieces of the read image data set as the inspection target.

In Step S106, for example, the CPU 11 uses the first read image data as the correct image data, sets the subsequent read image data as the inspection target, and performs the second inspection on all pieces of the read image data set as the inspection target.

In Step S107, the CPU 11 applies the contour extraction filter to the original image data or the read image data. At this time, the CPU associates the contour portion of the read image data set as the correct image data with the contour portion of the read image data being the inspection target by using the applied contour extraction filter.

In Step S108, the CPU 11 specifies a region of the read image data being the inspection target.

In Step S109, the CPU 11 determines whether or not the region specified in Step S108 is the contour portion. In a case where the CPU determines that the specified region is the contour portion (in the case of affirmative determination), the process proceeds to Step S110. In a case where the CPU determines that the specified region is not the contour portion, that is, a portion other than the contour portion (in the case of negative determination), the process proceeds to Step S111.

In Step S110, the CPU 11 adopts the inspection result of the second inspection for the contour portion determined in Step S109.

In Step S111, the CPU 11 adopts the inspection result of the first inspection for the portion other than the contour portion determined in Step S109.

In Step S112, the CPU 11 outputs the final inspection result for the read image data being the inspection target, based on the inspection result of the second inspection adopted in Step S110 and the inspection result of the first inspection adopted in Step S111. Then, the CPU ends a series of processes by the inspection program 15A.

As described above, according to the present exemplary embodiment, both the first inspection and the second inspection are performed on all pieces of read image data being the inspection target. Then, the inspection result of the second inspection is adopted for the contour portion of the read image data. The inspection result of the first inspection is adopted for the portion other than the contour portion. Therefore, it is possible to improve the inspection accuracy of the contour portion.

Second Exemplary Embodiment

In the first exemplary embodiment, a form in which, in a case where the first inspection is performed, both the first inspection and the second inspection are performed on all pieces of read image data being the inspection target. Then, the inspection result of the second inspection is adopted for the contour portion, and the inspection result of the first inspection is adopted for the portion other than the contour portion is described. In a second exemplary embodiment, a form in which the second inspection is performed on the contour portion of read image data being the inspection target, and the first inspection is performed on the portion other than the contour portion, and thus the two inspections do not overlap for each region will be described.

Figure 7:
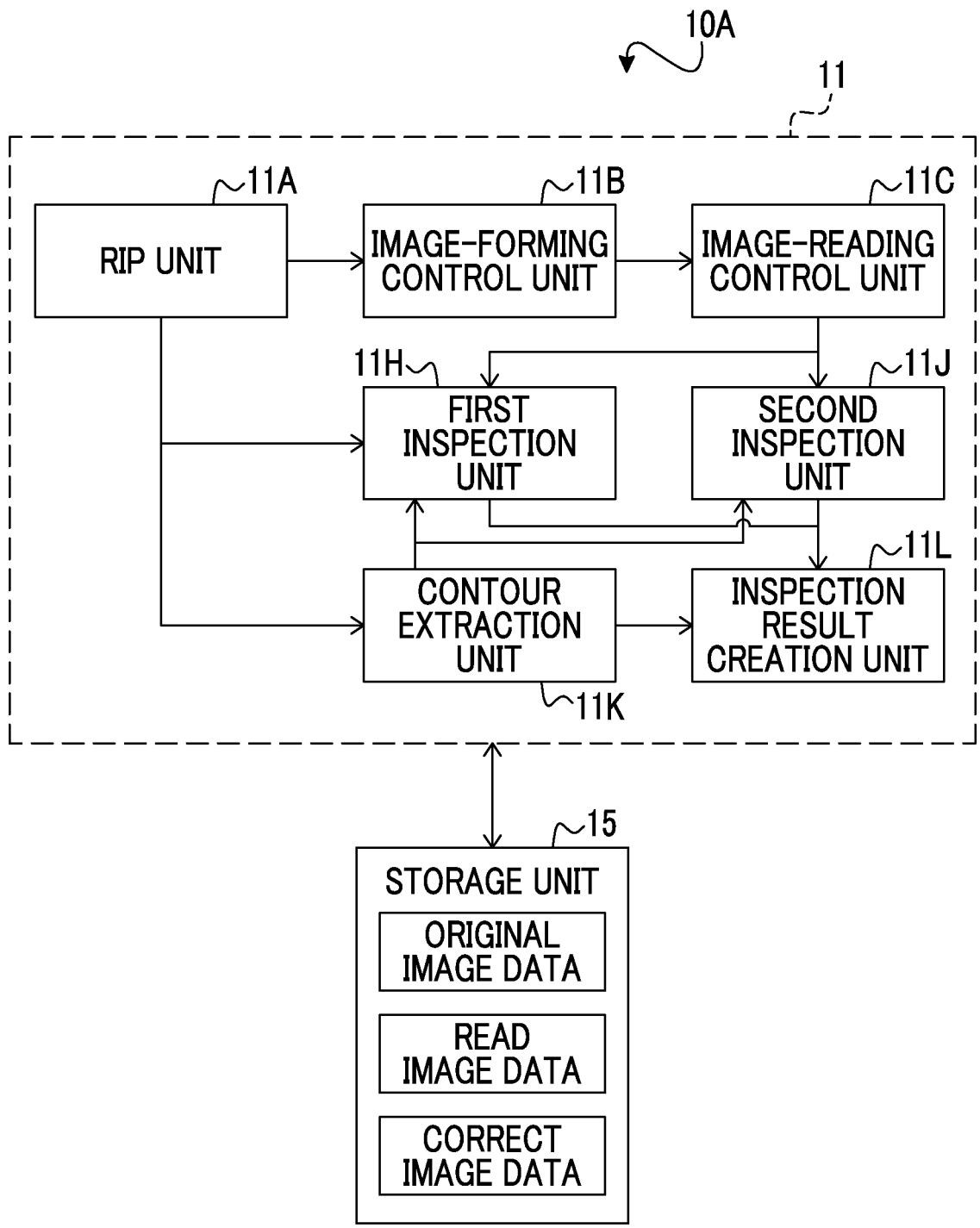
FIG. 7 is a block diagram illustrating an example of a functional configuration of an image forming apparatus according to a second exemplary embodiment.

FIG. 7 is a block diagram illustrating an example of a functional configuration of an image forming apparatus 10A according to the second exemplary embodiment.

As illustrated in FIG. 7, a CPU 11 in the image forming apparatus 10A according to the present exemplary embodiment functions as an RIP unit 11A, an image-forming control unit 11B, an image-reading control unit 11C, a first inspection unit 11H, a second inspection unit 11J, and a contour extraction unit 11K, and an inspection result creation unit 11L. The components having the identical functions as the components of the image forming apparatus 10 described in the first exemplary embodiment are denoted by the identical reference signs, and the repetitive description thereof will be omitted.

The contour extraction unit 11K applies a contour extraction filter to original image data or read image data, and inputs the obtained contour portion extraction result to each of the second inspection unit 11J and the first inspection unit 11H.

The second inspection unit 11J associates the contour portion of the read image data used as the correct image data in the second inspection with the contour portion of the read image data being the inspection target, by using the contour portion extraction result input from the contour extraction unit 11K. The second inspection unit 11J specifies the contour portion of the read image data being the inspection target, and performs the second inspection on the specified contour portion.

The first inspection unit 11H specifies the portion (for example, blank portion) other than the contour portion of the read image data as the inspection target by using the contour portion extraction result input from the contour extraction unit 11K, and performs the first inspection on the specified portion other than the contour portion.

The inspection result creation unit 11L determines the quality of the contour portion by using the inspection result of the second inspection, and determines the quality of the portion other than the contour portion by using the inspection result of the first inspection. The inspection result creation unit creates a final inspection result based on the determination results, and outputs the created inspection result.

Next, the action of the image forming apparatus 10A according to the second exemplary embodiment will be described with reference to FIG. 8.

FIG. 8 is a flowchart illustrating an example of a processing flow by an inspection program 15A according to the second exemplary embodiment.

Firstly, in a case where the image forming apparatus 10A is instructed to perform the inspection, the inspection program 15A is started to perform each of the following steps.

In Step S121 in FIG. 8, the CPU 11 acquires input image data from a document reading unit 18 or an external PC.

In Step S122, the CPU 11 performs RIP processing on the input image data acquired in Step S121 to generate original image data. The generated original image data is registered in the storage unit 15. As described above, for example, data (rasterized data) after the RIP processing, bitmap data, and GIF data are applied as the original image data.

In Step S123, the CPU 11 transmits a control signal to the image forming unit 19, and controls the operation of the image forming unit 19 to form the original image data registered in Step S122 on a recording medium and output an image-formed matter. A plurality of recording media may be used, and a plurality of image-formed matters may be output.

In Step S124, the CPU 11 transmits a control signal to the in-line sensor 20, and controls the operation of the in-line sensor 20 to read the image-formed matter output in Step S123, and output the read image data. In a case where a plurality of image-formed matters are provided, a plurality of pieces of read image data are output.

In Step S125, the CPU 11 applies the contour extraction filter to the original image data or the read image data. At this time, the CPU associates the contour portion of the read image data set as the correct image data with the contour portion of the read image data being the inspection target by using the applied contour extraction filter. In this example, the read image data being the inspection target is not particularly limited, but, in a case where the first read image data is used as the correct image data in the second inspection, the read image data after the first read image data is set as the inspection target.

In Step S126, the CPU 11 specifies a region of the read image data being the inspection target.

In Step S127, the CPU 11 determines whether or not the region specified in Step S126 is the contour portion. In a case where the CPU determines that the specified region is the contour portion (in the case of affirmative determination), the process proceeds to Step S128. In a case where the CPU determines that the specified region is not the contour portion, that is, a portion other than the contour portion (in the case of negative determination), the process proceeds to Step S129.

In Step S128, for example, the CPU 11 sets the first read image data as the correct image data, and performs the second inspection on the contour portion determined in Step S127.

In Step S129, the CPU 11 uses the original image data as the correct image data, and performs the first inspection on the portion other than the contour portion determined in Step S127.

In Step S130, the CPU 11 outputs the final inspection result for the read image data being the inspection target, based on the inspection result of the second inspection performed in Step S128 and the inspection result of the first inspection performed in Step S129. Then, the CPU ends a series of processes by the inspection program 15A.

As described above, according to the present exemplary embodiment, the second inspection is performed on the contour portion of the read image data being the inspection target, and the first inspection is performed on the portion other than the contour portion. Therefore, the two inspections do not overlap for each region, and thus it is possible to reduce the inspection processing time as compared with the first exemplary embodiment.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Hitherto, the examples of the inspection device and the image forming apparatus according to the exemplary embodiments are described above. The exemplary embodiments may have a form of a program for causing a computer to perform the functions of the units in the inspection device. The exemplary embodiments may have a form of a non-transitory computer readable storing medium that stores the programs.

In addition, the configuration of the inspection device described in the above exemplary embodiments is just an example, and may be changed depending on the situation in a range without departing from the gist.

The processing flow of the program described in the above exemplary embodiments is also just an example. In a range without departing from the gist, unnecessary steps may be deleted, a new step may be added, or the processing order may be changed.

In the above exemplary embodiments, the case where the program is executed, and thereby the processing according to the exemplary embodiments is realized by the software configuration using the computer is described, but the present disclosure is not limited to this. The exemplary embodiments may be realized, for example, by a hardware configuration or a combination of a hardware configuration and a software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An inspection device comprising:
a processor configured to
in a case where a first inspection of determining quality of read image data as an inspection target is performed using original image data as correct image data, the read image data being obtained by reading a first image-formed matter obtained by forming the original image data on a first recording medium, perform a second inspection on a contour portion included in the read image data as the inspection target, the second inspection using another read image data obtained by reading a second image-formed matter obtained by forming the original image data on a second recording medium, as the correct image data,
wherein the processor is configured to
perform both the first inspection and the second inspection on an entirety of the read image data as the inspection target,
determine quality of the contour portion by using an inspection result of the second inspection, and
determine quality of a portion other than the contour portion by using an inspection result of the first inspection.

2. The inspection device according to claim 1,
wherein the processor is configured to
perform the second inspection on the contour portion of the read image data as the inspection target,
perform the first inspection on a portion of the read image data as the inspection target other than the contour portion,
determine quality of the contour portion by using an inspection result of the second inspection, and
determine quality of the portion other than the contour portion by using an inspection result of the first inspection.

3. The inspection device according to claim 1,
wherein the processor is configured to, in a case where a result obtained by determining the quality of the contour portion is different from a result obtained by determining the quality of the portion other than the contour portion, display the different determination results as an inspection result of the read image data of the inspection target, and perform a control of displaying a screen for receiving an input of whether or not a user accepts the inspection result.

4. The inspection device according to claim 2,
wherein the processor is configured to, in a case where a result obtained by determining the quality of the contour portion is different from a result obtained by determining the quality of the portion other than the contour portion, display the different determination results as an inspection result of the read image data of the inspection target, and perform a control of displaying a screen for receiving an input of whether or not a user accepts the inspection result.

5. The inspection device according to claim 1,
wherein the processor is configured to extract the contour portion by applying a contour extraction filter to the original image data or the read image data.

6. The inspection device according to claim 2,
wherein the processor is configured to extract the contour portion by applying a contour extraction filter to the original image data or the read image data.

7. The inspection device according to claim 3,
wherein the processor is configured to extract the contour portion by applying a contour extraction filter to the original image data or the read image data.

8. The inspection device according to claim 4,
wherein the processor is configured to extract the contour portion by applying a contour extraction filter to the original image data or the read image data.

9. The inspection device according to claim 5,
wherein the processor is configured to associate the contour portion of the read image data used as the correct image data with the contour portion of the read image data as the inspection target by using the contour extraction filter in the second inspection.

10. The inspection device according to claim 6,
wherein the processor is configured to associate the contour portion of the read image data used as the correct image data with the contour portion of the read image data as the inspection target by using the contour extraction filter in the second inspection.

11. The inspection device according to claim 7,
wherein the processor is configured to associate the contour portion of the read image data used as the correct image data with the contour portion of the read image data as the inspection target by using the contour extraction filter in the second inspection.

12. The inspection device according to claim 8,
wherein the processor is configured to associate the contour portion of the read image data used as the correct image data with the contour portion of the read image data as the inspection target by using the contour extraction filter in the second inspection.

13. An image forming apparatus comprising:
a forming unit that forms original image data on a recording medium;
a reading unit that reads an image-formed matter obtained by formation of the forming unit; and
an inspection device that includes a processor configured to
in a case where a first inspection of determining quality of read image data as an inspection target is performed using original image data as correct image data, the read image data being obtained by reading a first image-formed matter obtained by forming the original image data on a first recording medium by the reading unit, perform a second inspection on a contour portion included in the read image data as the inspection target, the second inspection using another read image data obtained by reading a second image-formed matter obtained by forming the original image data on a second recording medium, as the correct image data,
wherein the processor is configured to
perform both the first inspection and the second inspection on an entirety of the read image data as the inspection target,
determine quality of the contour portion by using an inspection result of the second inspection, and
determine quality of a portion other than the contour portion by using an inspection result of the first inspection.

14. A non-transitory computer readable medium storing an inspection program causing a computer to execute:
in a case where a first inspection of determining quality of read image data as an inspection target is performed using original image data as correct image data, the read image data being obtained by reading a first image-formed matter obtained by forming the original image data on a first recording medium, performing a second inspection on a contour portion included in the read image data as the inspection target, the second inspection using another read image data obtained by reading a second image-formed matter obtained by forming the original image data on a second recording medium, as the correct image data,
wherein the computer is configured to
perform both the first inspection and the second inspection on an entirety of the read image data as the inspection target,
determine quality of the contour portion by using an inspection result of the second inspection, and
determine quality of a portion other than the contour portion by using an inspection result of the first inspection.

* * * * *